(No Model.)

T. SANDS.
ICE CREAM FREEZER.

No. 275,418. Patented Apr. 10, 1883.

WITNESSES.
W. R. Jones
J. B. Lauyen

INVENTOR:
Thomas Sands,
By his atty,
J. S. Brown.

UNITED STATES PATENT OFFICE.

THOMAS SANDS, OF NASHUA, NEW HAMPSHIRE.

ICE-CREAM FREEZER.

SPECIFICATION forming part of Letters Patent No. 275,418, dated April 10, 1883.

Application filed March 20, 1882. (No model.)

*To all whom it may concern:*

Be it known that I, THOMAS SANDS, of Nashua, in the county of Hillsborough and State of New Hampshire, have invented an Improvement in Ice-Cream Freezers; and I do hereby declare that the following is a full and exact description thereof, reference being had to the accompanying drawings, making part of this specification—

Figure 1:
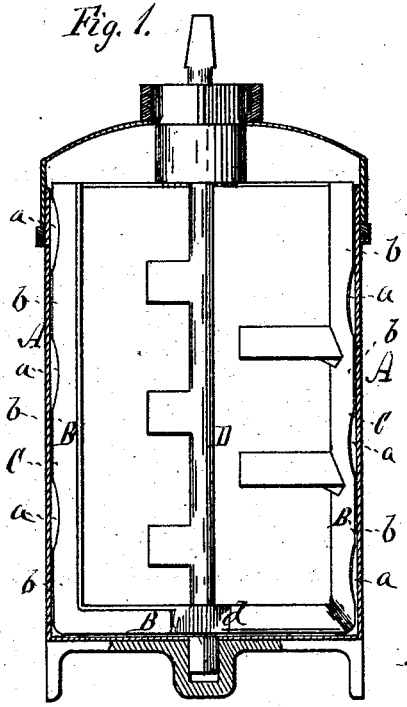
Figure 2:
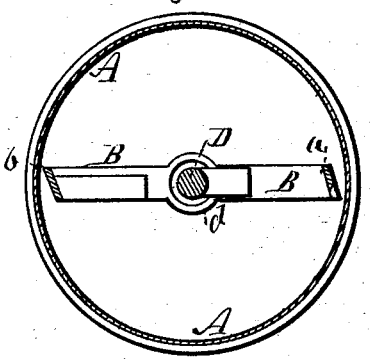
Figure 3:
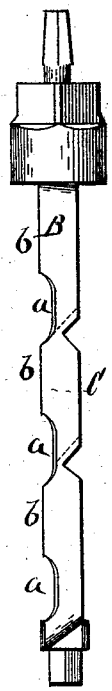

Figure 1 being a central vertical section of the cream-can of an ice-cream freezer, showing a side view of the dasher and scraper in position in the can; Fig. 2, a horizontal section of the same; Fig. 3, an edge view of the dasher and scraper separate.

Like letters designate corresponding parts in all the figures.

In ice-cream freezers which have scrapers on the dasher or cream-stirrer for keeping the inner surface of the can free from frozen cream adhering thereto, as in the Letters Patent issued to me September 23, 1879, No. 219,878, the dasher is turned with much difficulty toward the close of the process, on account of the resistance offered to the scrapers by the rapidly-stiffening and strongly-adhering cream on the said inner surface of the can. My present invention is for the purpose of greatly lessening that resistance and labor without diminishing the efficiency of the freezer. I accomplish this in the following manner, referring to the accompanying drawings.

Let A represent the cream-can, and B the dasher or cream-stirrer. The scrapers C C, situated on opposite sides of the dasher, revolve in close contact with the inner surface of the can A, being enabled to do so by the arms of the dasher having loose bearings playing on the shaft D, as shown at *d*, Fig. 2, and as set forth in my aforesaid Letters Patent, and the resistance offered to these scrapers by the adhering frozen cream on the surface of the can is proportional to the length of the scraping-edges of these scrapers together. Now I reduce the length of these edges one-half on the two scrapers by cutting away or forming notches *a a* alternately with scraping-edges *b b* in the edge of each scraper, the length of each notch being equal, or thereabout, to the length of each scraping-edge, and the notches of one scraper being at the same height as the scraping-edges of the other scraper, whereby the scraping-edges of one traverse the paths or breadths on the inner surface of the can left untouched by the other scraper. The use of two oppositely-situated scrapers is necessary to prevent displacing or injuring the driving-gear, which would result from throwing all the resistance offered by the scraper on one side of the dasher. In my device the resistance on the two sides is balanced, and the dasher works freely and without strain. Another advantage of this construction is that the cream on the surface of the can has double time to congeal before the scraper removes it.

I do not claim dasher-blades acting in alternate positions around the inner surface of the cream-can; but

What I claim as my invention, and desire to secure by Letters Patent, is—

In an ice-cream freezer, scrapers C C on opposite sides of the dasher or cream-stirrer B, constructed to scrape in contact with the inner surface of the can A, and having scraping-edges *b b*, alternating with notches *a a*, and so that the edges of one scraper traverse paths on the can-surface not touched by those of the other scraper, substantially as and for the purpose herein specified.

This specification signed by me this 9th day of February, 1882.

THOMAS SANDS.

Witnesses:
J. S. BROWN,
GARRET COSINE.